United States Patent [19]

Clendenen

[11] 4,308,141

[45] Dec. 29, 1981

[54] MODULAR FILTER SYSTEM

[76] Inventor: Frank B. Clendenen, 1545 Grass Valley Hwy., Apt. No. 8, Auburn, Calif. 95603

[21] Appl. No.: 179,060

[22] Filed: Aug. 18, 1980

[51] Int. Cl.³ .............................................. B01D 23/24
[52] U.S. Cl. .................................... 210/264; 210/276; 210/292
[58] Field of Search ......................... 210/264, 276, 292

[56] References Cited

U.S. PATENT DOCUMENTS

| | | | |
|---|---|---|---|
| 879,963 | 2/1908 | Hirt | 210/276 X |
| 2,442,594 | 6/1948 | Fraser | 210/276 X |
| 3,134,735 | 5/1964 | Greenleaf, Jr. | 210/264 |
| 3,239,061 | 3/1966 | Horning et al. | 210/276 X |
| 3,984,326 | 10/1976 | Bendel | 210/264 |

Primary Examiner—John Adee
Attorney, Agent, or Firm—Lothrop & West

[57] ABSTRACT

In a modular water filtration and companion backwash assemblage, a reservoir is sectioned into an upper, supply chamber and a lower, drain chamber by a plurality of modular, horizontally co-planar filter cells. A carriage assembly is selectively positioned over an individual cell and a depending backwash hood is lowered to isolate, hydraulically, the modular cell. Water is pumped upwardly, out of the hood, expanding and scrubbing the filter media. Jetwash probes intensify the cleansing action, and a baffle plate having displacement accelerators ensures equal but swift upward displacement of backwash waters. Each cell is sequentially backwashed on a continuous basis, allowing uninterrupted operation of the other filtration modules.

16 Claims, 4 Drawing Figures

MODULAR FILTER SYSTEM

BACKGROUND OF THE INVENTION

The use of a plurality of modular filter elements or cells, rather than a single large filter bed, presents distinct advantages for certain water and wastewater treatment systems. Not only is there considerable reduction in the size and complexity of the backwash apparatus, but also the need for a total system shutdown during the backwash operation is removed.

In accordance with the modular design, the smaller modular elements are each cleaned individually, and therefore, smaller pumps, plumbing components and associated backwash controls can be used. Certain components, such as backwash effluent storage tanks, air scour apparatus and mechanical rakes, can be eliminated through the use of modular filter construction. Also, with only one modular filter being backwashed at any given moment, the other modular filters remain operational, providing continuous filtration capabilities for the system.

Despite its attractiveness, however, the modular filter system concept has not been exploited to full advantage owing to shortcomings in the design of associated backwashing apparatus. The present invention overcomes the prior limitations in that it employs an overhead movable carriage and platform from which a specially designed backwash hood assembly depends. The hood assembly is selectively positioned over a particular filter cell and then lowered to form a water-tight seal with that cell, hydraulically isolating the modular cell from the surrounding body of water. This approach provides effective and rapid cleansing of the filter media within an individual cell without disrupting the ongoing filtration process occurring in the remaining filter cells.

The patents to C. E. Fraser, U.S. Pat. No. 2,442,592 and C. S. Horning et al, U.S. Pat. No. 3,239,061 are illustrative of the prior art which uses a carriage or the like, suspended above an open portion of the filter tank. The powered carriage transports a backwash apparatus over successive portions of the underlying filter media. Neither patent, however, contemplates the modular filter construction in combination with the hydraulic isolation capabilities of the movable backwash apparatus of the present invention.

H. Bendel, U.S. Pat. No. 3,984,326, provides individual compartmentalized flushing but relies solely upon the upward flow of backwash water resulting from the "vacuum pressure" created by a single pump. Bendel's disclosure is devoid of any suggestion as to the advantages of a high intensity scouring action provided by filter cleansing means, such as jetwash probes, or the like.

SUMMARY OF THE INVENTION

The basic construction and operation of a modular filter system are generally similar to that of the conventional singular filter bed system. Both systems require a tank, or reservoir, having a transversely positioned, porous filter element, vertically spaced above the tank floor. Water containing suspended particulate matter is introduced into a supply chamber above the filter, and clarified water is drawn away from a drain chamber beneath the filter. In its downward progression through the filter bed, the particulate matter becomes entrapped within the granular filter media, often coated with a polymer compound to enhance its adherent qualities.

After a period of time, the collected particulate matter partially clogs the filter media, and the system's filtering capabilities begin to wane. A backwash cycle is initiated which reverses normal downward fluid flow through the filter media. The filter media is expanded and washed of particulate matter, before the upwelled wastewater is drawn off. When all the filter media within the filter bed is thoroughly cleansed, the reverse flow is stopped and normal filter system operation can resume.

In contrast to the single, large filter bed of conventional design, the present invention includes wall partitions to divide the single large filter into a plurality of smaller individual filter cells. Rather than backwashing an entire large filtration bed on an occasional basis, the modular filter system of the present design is suited to sequential backwashing of individual filter cells on a continuous basis. Consequently, the modular filter system need never be shut down for a backwash or filter-cleaning cycle and all the filter cells but the one being cleaned are operable continuously.

A hydraulically isolating, backwash hood assembly and its mobile carriage and platform support assembly permit sequential backwashing of individual filter cells. The mobile support assembly overlies the open, top portion of the filter tank, and is selectively positionable over each of the filter cells. The backwash hood assembly depends from the mobile support assembly and is initially centered over a particular cell. The hood assembly is lowered to conjoin with the subjacent filter cell, thereby forming a water tight seal between the top edge of the filter cell and the lower edge of the hood assembly. The two engaging surfaces are congruent to ensure a proper hydraulic seal throughout the backwash cycle.

A backwash pump is activated, creating a negative head pressure within the backwash hood. Clarified water from the drain chamber is drawn up through the top-shrouded filter element, expanding and washing the filter media. A perforated baffle plate, transversely positioned within the backwash hood, equalizes the rate of backwash water flow across the mouth of the hood, ensuring even expansion of the filter media.

An array of vertical plates is attached to either side of the baffle plate. By reducing the available volume within the hood and channelizing the backwash flow, the plates act as displacement accelerators, increasing the speed and circulation of the upflowing backwash water and commensurately decreasing the amount of particulate matter which can settle upon the low velocity regions on the upper face of the baffle plate.

Once the filter media has been expanded and liquified, a group of jetwash probes is lowered into the filter media. Water under high pressure is then pumped through the probes and discharged into the filter media through agitation-concentrating nozzles. The expanded filter media is thoroughly scoured and cleaned by this intense washing action. Following jetwash cleaning, but while the filter media is still in an expanded state, a fluid polymer is introduced through the probes into the filter cell to recoat the media for the next filtration cycle.

The jetwash probes are then raised to clear the bottom of the hood, and the hood assembly is slightly raised to clear the wall partitions of the subjacent filter cell. At this juncture, the mobile support frame is shifted to center over the next cell to be backwashed, and the process is repeated. In sequential fashion, each of the cells is similarly cleansed while the overall filter system remains in continuous use.

DETAILED DESCRIPTION OF PREFERRED EMBODIMENT

Figure 1:
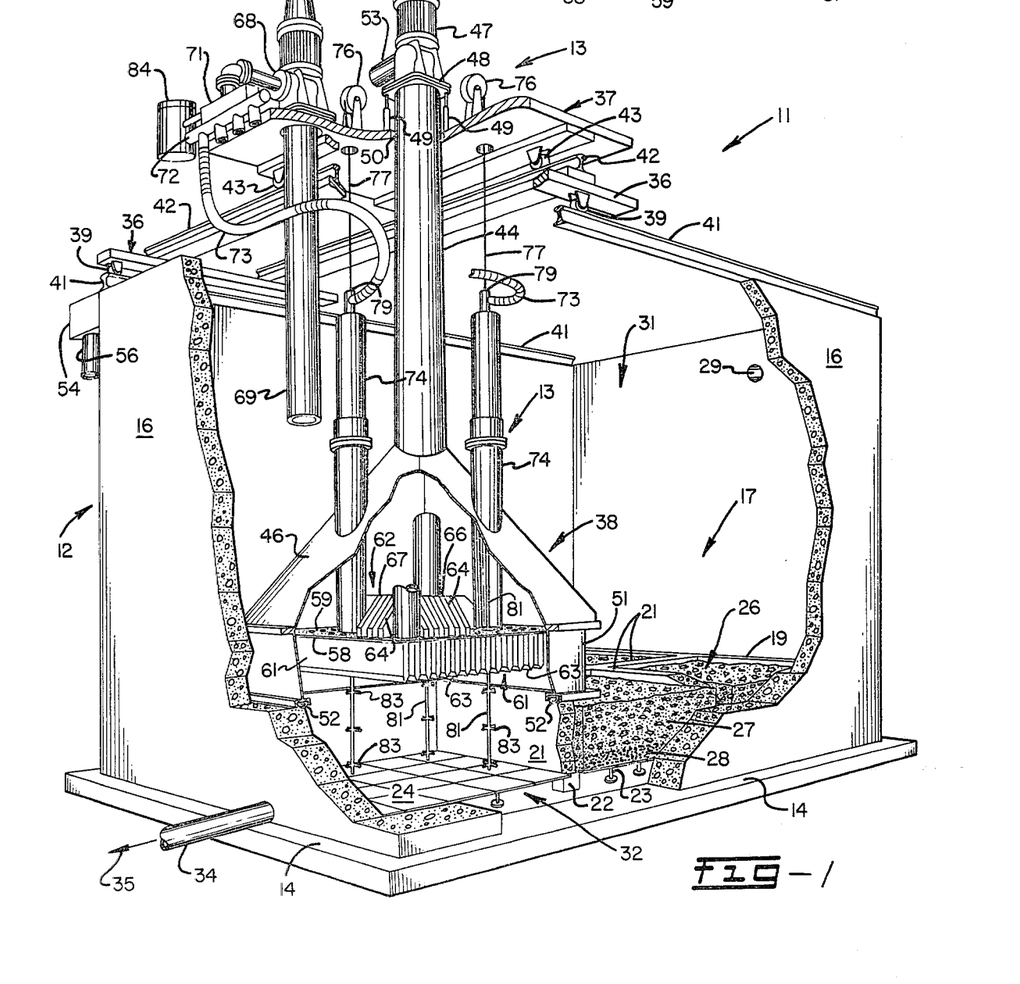
FIG. 1 is a perspective view of a preferred embodiment of the modular filter system with portions of the reservoir wall and hood assembly broken away, the hood assembly being positioned over one of the modular cells and with the filter media removed in order to show the jetwash probes in lowered position.

The modular filter system of the invention, generally designated by the reference numeral 11 comprises a filter reservoir 12, or tank, and a selectively positionable backwash assembly 13. As can be seen in FIG. 1, the reservoir 12 includes a floor 14, or base, and peripheral, upstanding walls 16. Contained within the bottom portion of the reservoir 12 is a filter bed 17, vertically spaced above the floor 14.

Figure 3:
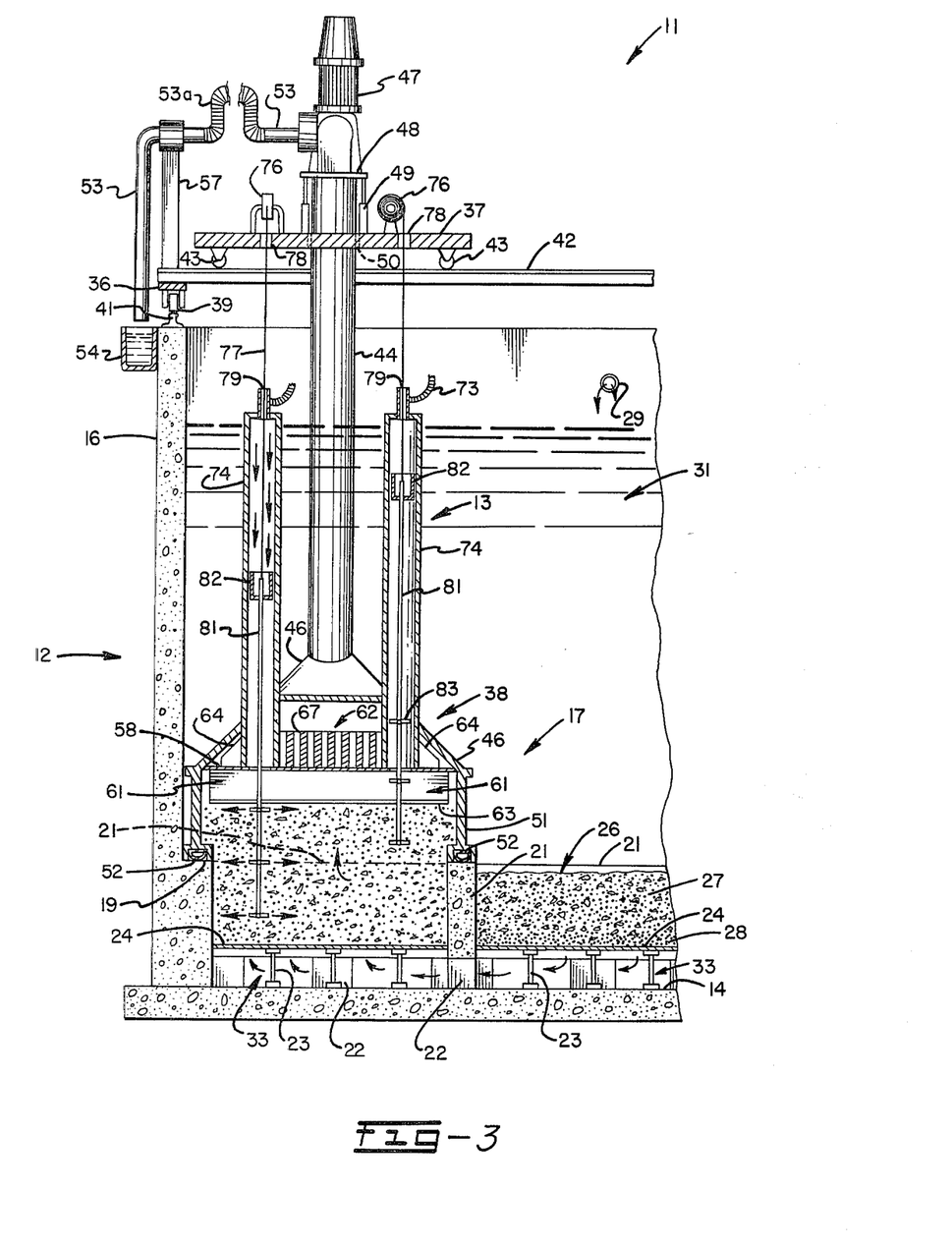
FIG. 3 is a cross-sectional view of the movable carriage and depending hood backwash assembly taken on the line 3—3 in FIG. 2, in position for backwashing the cell, one of the jetwash probes being shown in lowered position, within the expanded media, and another jetwash probe being shown in raised position, above the cell wall; and, FIG. 4 is a top plan view of the backwash hood, with portions of the hood structure broken away to reveal the upper array of displacement accelerators.

A perimeter shelf 19, or ledge, intruding from and integral with the lower portion of the upstanding walls 16, as can most clearly be seen in FIG. 3, defines the periphery of the filter bed 17. A plurality of intersecting element walls 21, attached to the shelf 19, further defines each modular filter element 18. Blocks 22 and rods 23 upstanding from the floor 14 serve to support and vertically space the element walls 21 and the porous plates 24, respectively, from the floor 14. The porous plates 24 also form the floor of each modular filter element 18, and thus support the dual-layered filter media 26 located in each cell.

An upper layer of crushed anthracite 27 and a lower layer of sand 28 form the filter media 26. As is well known in the filtration art, the relatively light, but moderately large-sized anthracite particles assume the bulk of the filtering workload, while the relatively heavy, but relatively small-sized sand particles act as a backup should unwanted particulate matter pass through the anthracite layer following a hydraulic surge. Other functional characteristics and operational advantages of the dual layered filter media will be explained more fully herein.

Filtration is initiated by allowing water containing particulate matter to flow from an inlet pipe 29 into a main or upper supply chamber 31. As the water level within the main supply chamber increases, the downward pressure impressed upon the upper surface of the filter media 26 increases commensurately. The resistance offered by the media 26 and the subjacent porous plate 24 is overcome and gravity induced flow through the media 26 and the porous plate 24 begins.

The upper layer of anthracite 27, as stated above, is composed of relatively large pieces, and thus provides considerable intersticial capacity for storing particulate matter. The anthracite layer also comprises roughly 80% of the total media depth, thereby further augmenting the filter's storage capacity and extending the duration of the filtration cycle before backwashing becomes necessary.

The lower layer of sand 28 acts as a backup to the primary, anthracite layer. For example, minute particulate matter may be able to pass through the relatively coarse anthracite layer, but then will become trapped within the lower layer of relatively fine sand grains.

In another instance, sporadic hydraulic supply fluctuations occur during normal operation of a filter system. These fluctuations in reservoir water level are conveyed as pressure variances upon the filter media 26, which can result in filter breakup. That is to say, already-lodged particulate matter becomes suddenly stripped from the media. The layer of sand 26 will entrap particles which become dislodged from the layer of anthracite 27 as a result of such a hydraulic surge, and prevents any contamination of the filtered water beneath the porous plate 24.

Immediately beneath the porous plate 24 of the filter bed 17 is a lower drain chamber 32, or plenum. Between the blocks 22 is a plurality of channels 33 providing passageways for fluid flow beneath the porous plates 24 (see FIGS. 2 and 3). Clarified water, therefore, emerges from the porous plates 24 and collects within the common lower chamber or plenum 32. A drain pipe 34 extends from the plenum 32 through the wall 16, conducting filtered water from the tank 12, as indicated by the directional arrow 35 in FIGS. 1 and 2.

The gravity flow filtration system works well, provided the head loss through the filter bed 17 does not become prohibitively high. After a period of time, however, the interstices between media grains become clogged with particulate matter, and the filter system can no longer clarify water at the desired rate. Therefore, to restore the filter bed to its prior flow rate capabilities, a filter cleansing backwash operation must be performed.

During a typical backwash process, fluid flow through the filter media is reversed and the media bed is expanded by the upflowing water. Since gravity flow is disrupted and the filter media are dispersed, normal filter operation cannot continue during the backwash cycle. A filtration system of conventional, single element design requires, therefore, either cessation of clarified water production during the cleansing operation, or provision of a second filter system to assume interim filtering duties.

The multi-element, modular filtration system, however, has the capability of performing continuous filtering and continuous backwashing cycles, significantly improving the practical application of the simple, gravity flow filtration principle. Since a multi-element system can filter while it is simultaneously being backwashed, a second filtration system is not necessary for continuous production of clarified water.

The mobile backwash assembly 13 as embodied herein makes sequential cleansing of individual filter elements possible without interrupting the ongoing filtering process being performed by the remaining filter elements. With particular reference to FIG. 1, the backwash assembly 13 generally comprises a carriage 36, a movable platform 37, and a hood assembly 38.

Figure 2:
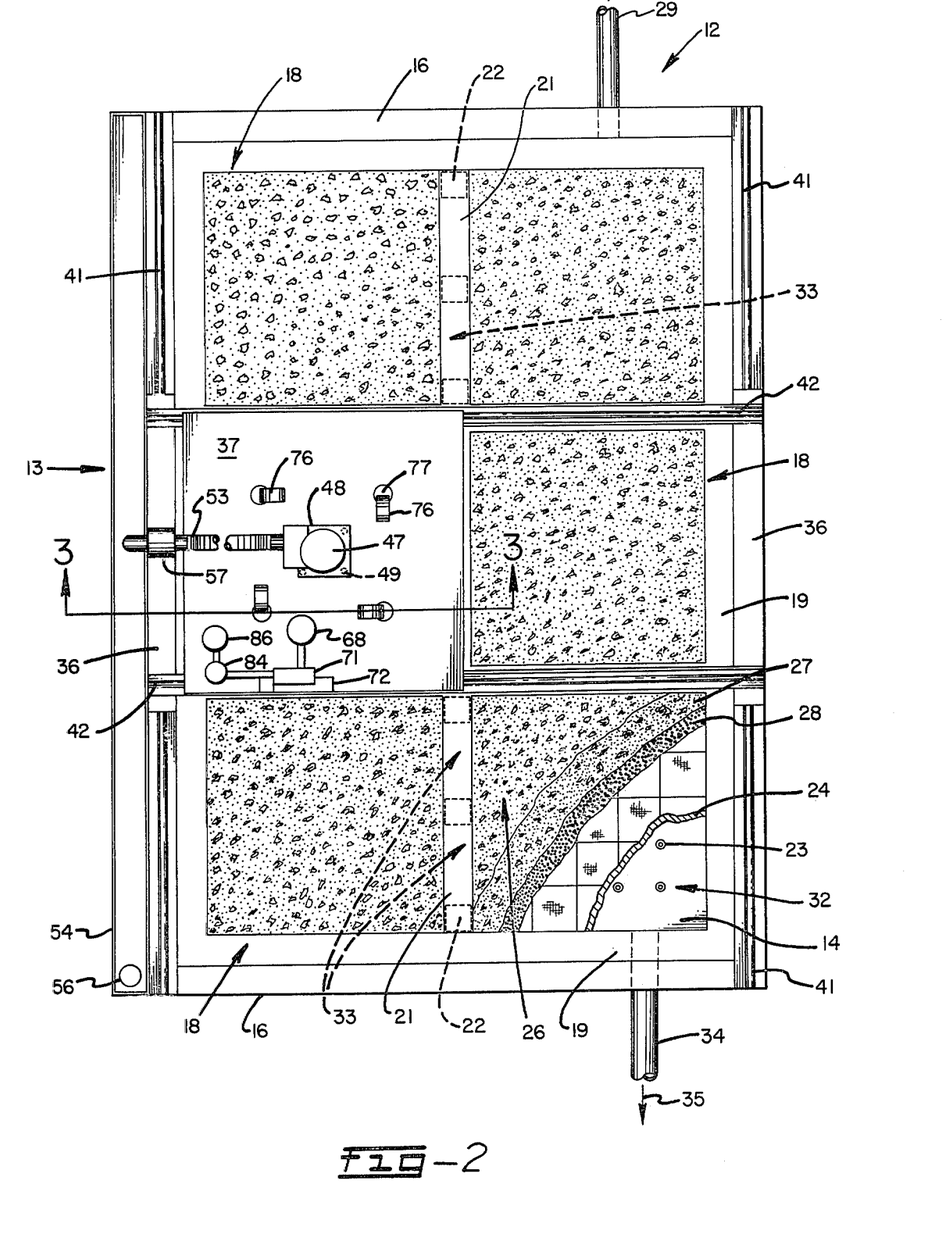
FIG. 2 is a top plan view of the system of FIG. 1 with the backwash assembly positioned over one of the cells, a portion of still another one of the cells being broken away to reveal the dual-layered filter media, the subjacent, porous plate, and the floor.

The carriage 36 is supported by carriage wheels 39 riding on a pair of parallel, lower rails 41. The lower rails 41, in turn, rest upon an opposing pair of walls 16, as shown in FIGS. 1 and 2. While different combinations of modular filter element numbers and shape may call for particular rail configurations, the six cell design depicted in the drawings preferably has the lower rails 41 running along the fore and aft, or longitudinal, direction of the reservoir 12.

The carriage 36 also includes a pair of parallel, upper rails 42, transversely positioned across the reservoir 12. Attached to the underside of the movable platform 37 are the platform wheels 43 which ride upon the upper rails 42. Both the carriage 36 and the movable platform 37 include a motorized rack and pinion drive assembly (not shown) wherein the respective rack runs adjacent and parallel to the respective supportive rail. A pinion drive is also provided upon both the carriage 36 and the platform 37 to engage its respective rack. Motive force is thus imparted to both the carriage 36 and the platform 37 along the longitudinal direction, and to the platform 37 alone along the transverse direction of reservoir 12. The mobile backwash assembly 13 can thereby be positioned over any selected one of the filter units.

Centrally depending from the movable platform 37 is the hood assembly 38. A backwash tube 44 interconnects the peak of a pyramidal portion 46 of the hood assembly 38 with the inlet port of a backwash pump 47. Interposed between the backwash pump 47 and the top of the tube 44 is a support plate 48. Hydraulic rams 49 are positioned between each corner of the plate 48 and the top of the platform 37. A circular tube aperture 50 allows the backwash tube 44 to slide vertically relative to the movable platform 37. Through selective actuation of the rams 49, then, the entire hood assembly 38 can be raised or lowered through a limited range.

Assuming that the hood assembly 38 is in a raised position, the extension capability of the rams 49 is such that the lower edge of the hood assembly 38 is vertically spaced above the ledge 19 and the top of the element side walls 21. Unimpeded movement of the hood assembly 38 through a horizontal plane is thereby afforded as the carriage and attendant components are shifted from one cell to another, as desired.

Through appropriate manipulation of the rack and pinion drive assemblies of the carriage 36 and the platform 37, the hood assembly 38 is centered over the first cell to be backwashed. At this juncture, the hydraulic rams 49 are actuated to lower the assembly 38 upon a subjacent filter element 18.

The size, shape, and construction of the lower edge of the hood assembly 38 is such that a hydraulic seal is created over the element 18. Depending from the pyramidal portion 46 is a hollow, vertically walled box 51. The lower edge of the box 51 corresponds precisely in dimension and form to the upper edges of the element side walls 21 and the ledge 19, which form the upper periphery of the element 18. A flexible, tubular seal 52, constructed of rubber or the like, extends around the lower edge of the box 51 and ensures the hydraulic seal when the hood is lowered into nesting position over the element 18. FIGS. 1 and 3 best illustrate the manner in which the hydraulic seal is formed over the element 18.

With the hood assembly in hydraulically sealed engagement with the cell 18, the backwash pump 47 is actuated to initiate the media cleansing operation. A negative head pressure is created as water is drawn upwardly from the inner confines of the box 51 and the pyramidal hood 46, into the backwash tube 44 and discharged through an outlet hose 53 into a trough 54, or gutter. A wastewater pipe 56, connected to the trough 54, drains off all effluent from the backwash operation discharged into the trough.

Upstanding from the carriage 36 is a brace 57, supporting the rigid portion of the hose 53 which feeds the trough 54. A flexible, extensible portion 53a of the hose 53 exists between the brace 57 and the backwash pump 47, thus allowing free transverse movement of the platform 37.

With specific reference to FIG. 3, the existence of a negative head pressure within the hood 46 causes clarified water to be drawn upwardly from the plenum 32 through the porous plate 24 and into the filter media 26. The filter media transform into an expanded state, and the upwelling water creates a hydraulic turbulence which washes trapped particulate matter from the media.

A baffle plate 58, horizontally positioned within the hood at approximately the elevation of the junction between the pyramidal portion 46 and the box portion 51, is perforated by a plurality of apertures 59. The apertures 59 are equally distributed across the baffle plate 58, thereby assuring a uniform expansion of the media and a balanced rate of effluent upflow through the hood.

Once the particulate matter has been freed from the media, a sufficient rate of effluent upflow must be maintained to draw the fluid-suspended particulate matter from the confines of the hood. Since the cross sectional area of the backwash tube 44 is considerably smaller than the cross sectional apertured area of the baffle plate 58, the rate of effluent upflow in the vicinity of the baffle plate 58 is limited, or reduced, accordingly. To increase the upflow rate and ensure vertical transport of the particulate matter, a lower set of displacement accelerators 61 and an upper set of displacement accelerators 62 are attached to the baffle plate 58, as shown in FIG. 1.

The lower displacement accelerators 61 comprise a plurality of parallel, relatively thick, vertical plates which depend from the underside of the baffle plate 58. As can be seen most clearly in FIG. 1, the bottom edges 63 of the lower set of accelerators 61 converge downwardly to present less resistance to the upflowing effluent. By reducing the available volume between the bottom of the baffle plate 58 and the upper uninterrupted boundary of the expanded media (see FIG. 3), and by channeling the upward flow directly toward and through the baffle plate apertures 59, the lower set of accelerators 61 increases the rate of upward flow, thereby removing the particulate material from the media and carrying the material upwardly through the apertures 59 while the media is retained below the plate 58.

Figure 4:
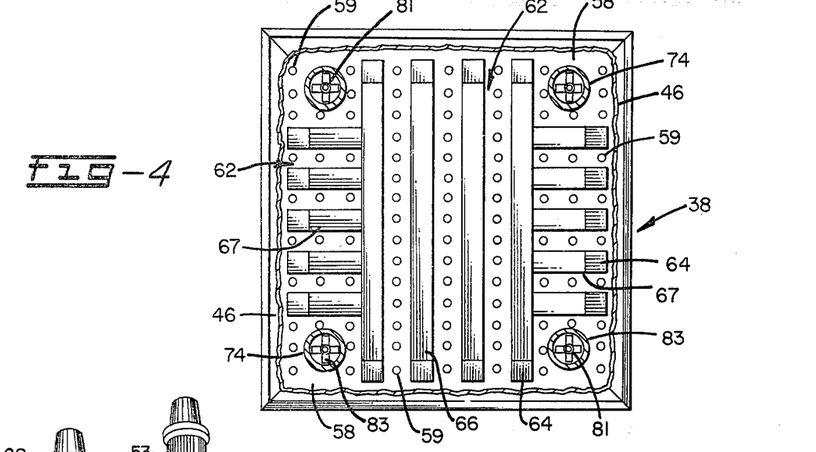

The upper displacement accelerators 62 comprise an array of relatively thick vertical plates attached to the upper side of the baffle plate 58. Owing to the pyramidal shape of the upper portion 46 of the hood assembly 38, the outer edges 64 of the upper displacement accelerators 62 are angled accordingly. Making reference to FIG. 4, it will be seen that not all of the upper displacement accelerators 62 are parallel, there being a plurality of parallel transverse displacement accelerators 66 and a plurality of parallel longitudinal displacement accelerators 67. The transverse displacement accelerators 66 are vertically collinear with respective lower displacement accelerators 61 whereas the longitudinal displacement accelerators 67 are oriented perpendicular to the transverse displacement accelerators 66. Nevertheless, both the longitudinal and the transverse upper displacement accelerators 62 act in identical fashion to reduce the volumetric capacity of the pyramidal portion of the hood 46, thereby sustaining the increased rate of upward flow and assuring that at least most of the particulate matter is carried upwardly out of the hood.

While the expansion of the filter media 26 during backwashing removes a good deal of the captured particulate matter, thorough filter cleansing requires additional measures. Once the filter media 26 is expanded, a jetwash pump 68 is actuated. Water is drawn from the main, or upper, supply chamber 31 into an intake pipe 69, and passes through the jetwash pump 68 and a solenoid-controlled valve 71 before entering a jetwash manifold 72. A plurality of flexible jetwash hoses 73 interconnects the outlets of manifold 72 with the tops of respective, hollow jetwash columns 74.

The hollow jetwash columns 74 are radially spaced about the backwash tube 44, and extend through the pyramidal hood portion 46 to the upper surface of baffle plate 58, as can be seen in FIG. 1. The transverse and longitudinal displacement accelerators, 66 and 67, respectively, are positioned around jetwash columns 74 to effect a high displacement factor within the pyramidal portion 46 of the hood (see FIG. 4).

Spring loaded reels 76 are positioned upon the platform 37, and each includes a retractable cable 77. With reference to the right-hand jetwash column 74, as viewed in FIG. 3, a retractable cable 77 is shown in its normally withdrawn position. Passing through a hole 78 in the platform 37 and a suitable hydraulic seal 79 in the top of the jetwash column 74, the lower end of the cable 77 is attached to the upper end of a tubular jetwash probe 81. The normal spring tension, or bias, within the reel 76 maintains the tubular jetwash probe 81 in this elevated position.

After the jetwash pump 68 is activated, however, water enters the upper end of the jetwash columns 74 and exerts downward pressure upon the cups 82. The cups 82 slidably engage the inner walls of the jetwash columns 74 in the nature of a piston head, and the interface between the two forms a sufficient hydraulic seal to contain in large measure the inrushing water. With reference to the left-hand jetwash column 74, as viewed in FIG. 3, the water pressure translates the cup 82 and attached jetwash probe 81 downwardly. The pressure is sufficient to overcome the bias afforded by the spring loaded reel 76, and the cable 77 is extended. Since the upper end of the tubular jetwash probe 81 is open, the water flows into and passes down through the probe 81 to exit through a plurality of horizontal jets 83. Normally, all the jetwash probes 81 would lower simultaneously to the position shown by the probes in FIG. 1 and the left-hand probe in FIG. 3, since jetwash manifold 72 simultaneously distributes an equal amount of water to all of the jetwash tubes 73. For illustrative purposes only, however, the right-hand jetwash probe 81, as viewed in FIG. 3, is shown in raised, or "at rest", position.

With all of the jetwash probes 81 in a lowered position, the high intensity scouring action provided by the jets 83 thoroughly cleanses the filter media 26. At the same time, the continuing backwash flow provided by the backwash pump 47 carries off the particulate matter removed by the jetwash action. The rate of backwash upflow, however, must be carefully controlled to ensure that the particulate matter is carried away, but not the filter media 26. With a proper rate of backwash upflow, the expanded media 26 just approaches the bottom edges of the lower set of displacement accelerators 61, as shown in FIG. 3.

Following cleaning, the jetwash pump 68 is turned off, and backwashing is continued for a short period to remove any remaining matter confined by the hood. The solenoid valve 71 is then actuated, interconnecting a polymer pump 84, supplied with polymer by a tank 86, with the jetwash manifold 72 (see FIG. 2). Using the fluid distribution and probe system of the jetwash assembly, a polymer product is introduced into the expanded media 26.

The polymer coats the media 26, enhancing its ability to capture and retain particulate matter. The nature of the polymer is such, however, that when the media 26 are subjected to rigorous washing during the jetwash phase, both the particulate matter and the polymer are stripped from the filter media 26.

At this juncture, both the polymer pump 84 and the backwash pump 47 are turned off, allowing the media 26 to settle within the filter cell 18. With no hydraulic pressure being impressed upon the cups 82, the reels 76 retract the cables 77 and withdraw the jetwash probes 81 from the settling media 26. Owing to the recited differences in size and specific gravity of the anthracite 27 and the sand 28, the media 26 naturally settles into a dual layered state (see FIGS. 1 and 2).

Having completed the backwash cycle for one modular cell 18, the backwash assembly 13 is ready to be relocated over the next cell for the process to be repeated. The hydraulic rams 49 are actuated to raise the backwash assembly 13 into a sufficiently elevated position so that the lower edge of the box portion 51 of the hood will clear the ledge 19 and the upper edge of the cell's side walls 21. The assembly 13 is then ready for transport to the next cell.

The movement of both the carriage 36 and the movable platform 37 can be programmed, through the use of conventional logic circuitry, to position sequentially the backwash assembly over each modular cell 18 in whatever order desired. Timing circuitry, also of well known design, can actuate the hydraulic rams and various pumps in the appropriate sequence and for the proper duration to repeat consistently the complete backwash cycle for each cell. Thus, the modular filter system of the invention is capable of completely automatic and continuous operation, and can therefore take full advantage of the potential afforded thereby.

Although the jetwash procedure described is extremely effective in providing a high intensity scouring action, it should be noted that other means can be used to effect surface washing including mechanical or sonic agitators or air diffusors.

I claim:

1. A modular filter system comprising:
   a. a reservoir, including a horizontal floor and an upstanding peripheral wall, said peripheral wall being rectangular in plan and including a pair of longitudinal walls and a pair of transverse walls;
   b. a plurality of porous filter elements arranged to form a generally coplanar filter array, said array of filter elements including:

(1) an upstanding perimeter ledge contiguous to the inner, lower portion of said peripheral wall of said reservoir;

(2) a plurality of upstanding filter element side walls attached to said perimeter ledge, said perimeter ledge and said filter element side walls defining the periphery of each of said filter elements; and, (3) a plurality of horizontal porous plates attached to said perimeter ledge and said filter element side walls adjacent the bottom thereof to form a plurality of containers, each of said containers being substantially filled with filter media;

c. means for supporting said filter array in a horizontal attitude within said reservoir and at a location above and generally parallel to said floor to define a supply chamber above said filter array and a drain chamber beneath said filter array;

d. inlet means for introducing water having particulate matter into said supply chamber;

e. outlet means for drawing off clarified water from said drain chamber, said particulate matter having become lodged within said array of filter elements as the water passes from said supply chamber downwardly through said filter elements;

f. backwash means for hydraulically isolating and cleaning each of said filter elements of said filter array individually and sequentially, said backwash means comprising:

(1) a mobile frame located above said reservoir, said mobile frame being selectively positionable over each of said filter elements and including a carriage and a platform supported on said carriage, said carriage being movable upon longitudinal rails positioned upon said longitudinal walls for fore and aft translation of said carriage, and said platform being movable upon transverse rails positioned upon said carriage for transverse movement of said platform;

(2) a hood, said hood depending from and attached to said platform for the selective positioning of said hood within said reservoir as said carriage and said platform are moved on their respective rails in predetermined directions, the open end of said hood being directed downwardly and being defined by a lower edge conforming to the upper edge of said periphery of each of said filter elements;

(3) gasket means for sealing the interface between said lower edge of said hood and said upper edge of said periphery of each of said filter elements;

(4) jack means for selectively raising and lowering said hood, so that in a first lowered position, said hood hydraulically isolates the respective one of said filter elements from said supply chamber, and in a second raised position, said hood is sufficiently elevated above said upper edge of said periphery to allow horizontal movement of said hood to another of said filter elements;

(5) pump means for extracting water from within said hood when said hood is in said first lowered position;

(6) discharge conduit means interconnecting said pump means and the interior of the upper portion of said hood for providing a backwash flow within said filter media when said hood is in said first lowered position and said pump means is actuated;

(7) an internal baffle plate, said baffle plate being horizontally positioned within said hood to span said open end thereof and including a plurality of apertures for water passage to equalize the rate of backwash flow through said hood; and, (8) displacement means for reducing both the volumetric capacity within said hood and the total cross sectional area across said open end of said hood, thereby increasing the rate of backwash flow across said open end, said displacement means comprising a plurality of lower displacement accelerators and a plurality of upper displacement accelerators, said lower displacement accelerators comprising an array of thickened vertical plates depending from the underside of said baffle plate, and said upper displacement accelerators comprising an array of thickened vertical plates upstanding from the upper side of said baffle plate, so that water is drawn by said pump means upwardly from said drain chamber through said porous plate and said filter media, and then into said hood and said conduit means, said backwash flow having a velocity sufficient to strip particulate matter from said filter media and carry the particulate matter to said conduit means for discharge to waste.

2. A modular water filter system as in claim 1 including jetwash means for scrubbing and cleaning said filter media, said jetwash means introducing high velocity water currents into said filter media during backwash flow capable of further removing particulate matter from said filter media.

3. A modular water filter system as in claim 2 wherein said jetwash means comprises:

a. a plurality of tubular jetwash columns, the lower end of said columns extending to said baffle plate to coincide with respective openings through said baffle plate, said columns passing upwardly through the walls of said hood and terminating at a location above said hood;

b. a plurality of tubular jetwash probes coaxially positioned, respectively, within said jetwash columns and capable of moving between an upper transport position during the movement of said mobile frame and a lower position during backwash;

c. and means for selectively moving said jetwash probes between said upper position and said lower position.

4. A modular water filter system as in claim 3 in which said probe moving means includes a plurality of reels mounted on said platform; a plurality of wire cables wound on said reel, the free end of said cables extending downwardly through said tubular jetwash columns and mounted on respective ones of said tubular jetwash probes; and means for reeling in and unreeling said cables to lift and lower said probes, respectively.

5. A modular water filter as in claim 4 in which said means for reeling in said cables includes a spring; in which said means for unreeling said cables includes a plurality of cups mounted on said probes adjacent the upper ends thereof, said cups extending in the manner of a piston head across the interior walls of said columns; and including a jetwash pump connected to the upper ends of said tubular jetwash columns for introducing water under pressure into said columns and against the upper surface of said cups in order to urge said jetwash probes downwardly from said upper position to said lower position.

6. A modular water filter as in claim 5 further including means for introducing a polymer into the filter media while said probes are in lower position.

7. A modular water filter as in claim 6 in which said polymer introducing means includes a polymer pump and a polymer supply tank connected to said polymer pump.

8. A modular filter system as in claim 1 further including high intensity scouring means for stripping particulate matter from said filter media.

9. A modular filter system as in claim 8 in which said high intensity scouring means includes a plurality of jetwash probes positioned within said filter media when said hood is in said first lowered position and said pump means is actuated.

10. A filter system for clarifying fluid comprising:
 a. a reservoir including a horizontal floor and an upstanding peripheral wall;
 b. filter means for removing particulate matter from fluid, said filter means being located within said reservoir and spaced above and generally parallel to said floor to define a supply chamber above said filter means and a drain chamber beneath said filter means;
 c. inlet means for introducing fluid containing particulate matter into said supply chamber;
 d. outlet means for drawing off clarified fluid from said drain chamber, the particulate matter being trapped by and lodged within said filter means as the fluid containing particulate matter passes downwardly from said supply chamber through said filter means and into said drain chamber;
 e. backwash means for selectively isolating and cleaning said filter means, said backwash means including:
  (1) a hood positioned within said supply chamber, said hood including an open end directed downwardly and having a lower marginal edge conforming to the upper edge of said peripheral wall;
  (2) gasket means for sealing the interface between said lower edge of said hood and the upper edge of said wall when said hood is in a first lowered position;
  (3) jack means for selectively raising and lowering said hood, so that in said first lowered position, said hood hydraulically isolates said filter means from the balance of said supply chamber, and so that in a second raised position, fluid introduced into said supply chamber passes downwardly through said filter means;
  (4) suction means for extracting fluid from within said hood when said hood is in said first lowered position, said suction means creating a cleansing backwash flow drawing clarified fluid upwardly from said drain chamber and dislodging particulate matter from said filter mean as said fluid ascends through said filter means;
  (5) jetwash means for introducing high velocity cleansing fluid into said filter means when said hood is in said first lowered position, said jetwash means being effective to strip additional particulate matter from said filter means as the backwash flow is drawn upwardly and out of said hood; and,
  f. means for selectively elevating said jetwash means above said filter means preparatory to filtering and for lowering said jetwash means into said filter means preparatory to backwashing.

11. An apparatus as in claim 10 wherein said hood further includes an internal baffle plate, said baffle plate being positioned within said hood to span said open end and including a plurality of apertures equally distributed across said baffle plate to equalize the expansion of said filter means below all portion of said baffle plate.

12. An apparatus as in claim 11 wherein said hood also includes displacement means for reducing the volumetric capacity within said hood and for reducing the extent of the volume between the bottom of said baffle plate and the upper boundary of the filter means in expanded condition, thereby increasing the rate of backwash flow upwardly through said apertures and out of said hood.

13. An apparatus as in claim 12 wherein said displacement means comprises a plurality of lower displacement accelerators and a plurality of upper displacement accelerators, said lower displacement accelerators comprising an array of spaced vertical plates depending from the underside of said baffle plate, and said upper displacement accelerators comprising an array of spaced vertical plates upstanding from the upper side of said baffle plate.

14. An apparatus as in claim 10 wherein said jetwash means comprises:
 a. a plurality of vertical tubular probes each including a plurality of laterally oriented jets;
 b. means for mounting said probes on said apparatus so that in said first lowered position of said hood said probes extend downwardly into said filter means and in said second raised position of said hood said probes are elevated above the level of said upper edge of said peripheral wall; and,
 c. means for introducing fluid into said probes so that in said first lowered position of said hood, fluid emerges laterally from said jets at high velocity into said filter means.

15. An apparatus as in claim 14 in which said probe mounting means includes a plurality of hollow vertical columns each mounted on said hood coaxially with a respective one of said probes; means for urging each of said probes upwardly relative to the respective one of said columns; and means for selectively urging each of said probes downwardly relative to the respective one of said columns in opposition to said upwardly urging means.

16. A modular filter system comprising:
 a. a reservoir, including a horizontal floor and an upstanding peripheral wall;
 b. a plurality of porous filter elements arranged to form a generally coplanar array, said array being positioned within said reservoir above and generally parallel to said floor to define a supply chamber above said filter array and a drain chamber beneath said filter array;
 c. inlet means for introducing fluid containing particulate matter into said supply chamber;
 d. outlet means for drawing off clarified fluid from said drain chamber, the particulate matter having become lodged within said array of filter elements as the fluid passes from said supply chamber downwardly through said filter elements; and,
 e. backwash means for hydraulically isolating and cleaning each of said filter elements of said filter array individually and sequentially, said backwash means including:

(1) a mobile frame located above said reservoir, said mobile frame being selectively positionable over each of said filter elements;

(2) a hood, said hood depending from and attached to said mobile frame, the open end of said hood being directed downwardly and being defined by a lower edge of each of said filter elements;

(3) gasket means for sealing the interface between said lower edge of said hood and said upper edge;

(4) jack means for selectively raising and lowering said hood, so that in a first lowered position, said hood hydraulically isolates the respective one of said filter elements from said supply chamber, and in a second raised position, said hood is sufficiently elevated above said upper edge to allow horizontal movement of said hood to a position over another of said filter elements;

(5) suction means for extracting fluid from within said hood when said hood is in said first lowered position, thereby creating a cleansing backwash flow through said respective one of said filter elements; and, (6) high intensity jetwash means on said hood for scouring particulate matter from said filter means in addition to the particulate matter dislodged by the backwash flow.

* * * * *